(12) United States Patent
Wu

(10) Patent No.: US 7,974,275 B2
(45) Date of Patent: Jul. 5, 2011

(54) SATURATED DATAGRAM AGING MECHANISM

(75) Inventor: Chien-Hsien Wu, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 1234 days.

(21) Appl. No.: 10/753,560

(22) Filed: Jan. 9, 2004

(65) Prior Publication Data

US 2005/0152277 A1 Jul. 14, 2005

(51) Int. Cl.
*H04Q 11/00* (2006.01)
(52) U.S. Cl. ............... 370/381; 370/395.71; 370/412; 370/422; 370/429; 709/245; 711/219
(58) Field of Classification Search ............ 370/252, 370/351, 395.71, 469, 236, 395.4, 395.7, 370/428, 429, 235, 353, 355, 357–389, 395.72, 370/412–418, 422, 423; 709/212–215, 245, 709/246; 711/101, 147, 148, 219
See application file for complete search history.

(56) References Cited

U.S. PATENT DOCUMENTS

| 5,329,618 | A | * | 7/1994 | Moati et al. ............ 709/245 |
| 5,745,489 | A | * | 4/1998 | Diaz et al. ............ 370/395.7 |
| 5,757,771 | A | * | 5/1998 | Li et al. ............ 370/235 |
| 5,896,380 | A | * | 4/1999 | Brown et al. ............ 370/388 |
| 6,104,696 | A | | 8/2000 | Kadambi et al. |
| 6,154,462 | A | * | 11/2000 | Coden ............ 370/403 |
| 6,292,491 | B1 | * | 9/2001 | Sharper ............ 370/412 |
| 6,424,659 | B2 | * | 7/2002 | Viswanadham et al. ...... 370/469 |
| 6,594,270 | B1 | * | 7/2003 | Drummond-Murray et al. ............ 370/412 |
| 6,674,720 | B1 | * | 1/2004 | Passint et al. ............ 370/235 |
| 6,717,912 | B1 | * | 4/2004 | Lemyre et al. ............ 370/230 |
| 7,133,399 | B1 | * | 11/2006 | Brewer et al. ............ 370/360 |
| 7,139,269 | B2 | * | 11/2006 | Kalkunte et al. ............ 370/422 |
| 7,274,690 | B1 | * | 9/2007 | Park et al. ............ 370/388 |
| 7,301,897 | B2 | * | 11/2007 | Lutgen et al. ............ 370/229 |
| 7,366,194 | B2 | * | 4/2008 | Yu et al. ............ 370/429 |
| 7,468,975 | B1 | * | 12/2008 | Davis ............ 370/389 |
| 2001/0007561 | A1 | * | 7/2001 | Aznar et al. ............ 370/412 |
| 2002/0009084 | A1 | * | 1/2002 | Kalkunte ............ 370/391 |
| 2002/0071387 | A1 | * | 6/2002 | Horiguchi et al. ............ 370/229 |
| 2002/0181452 | A1 | * | 12/2002 | Norman et al. ............ 370/380 |
| 2004/0165609 | A1 | * | 8/2004 | Herbst et al. ............ 370/412 |

* cited by examiner

*Primary Examiner* — Kwang B Yao
*Assistant Examiner* — Jeffrey M Rutkowski

(57) ABSTRACT

Methods for aging datagrams in the memory portion of a datagram distribution device or other network device are provided. According to some of these methods, an attribute of each datagram entering the device may be used to assign an initial aging counter value to each datagram. Then, the attribute-specific aging counter values may be used to extend the time until expiration of certain datagrams relative to other datagrams. Also, devices for implementing these methods are provided.

20 Claims, 6 Drawing Sheets

SATURATED DATAGRAM AGING MECHANISM

BACKGROUND OF THE INVENTION

1. Field of the Invention

Certain embodiments of the present invention are directed generally to methods for aging datagrams that are stored in datagram distribution devices. Certain other embodiments of the present invention are directed generally to datagram distribution devices that are capable of performing and monitoring datagram aging.

2. Description of the Related Art

In today's telecommunications networks, data packets are often stored in memory units of network devices such as, but not limited to, nodes, modules, routers, and switches of a network. However, it is inefficient and generally undesirable for packets to be stored for extended periods of time in the memories of network devices. Hence, the related art has developed various methods for keeping track of how long packets stay in these memories and for discarding packets that remain in network device memories for periods of time that are deemed to be excessive.

FIG. 1 illustrates how packet 100 may be stored in Common Buffer Pool 110, which is part of a networked device according to the related art. As shown in FIG. 1, Common Buffer Pool (CBP) 110 includes a plurality of regions or cells, each having an address, wherein packet 100 may be stored.

Before entering CBP 110, the related art networked device that includes CBP 110 time-stamps packet 100. This time-stamping typically records when packet 100 entered into the device. In some instances, this time-stamping sets an AGING COUNT portion of packet 100 to a "0" value, which then gets incremented upward over time, as will be discussed below.

According to the related art, when aging packet 100 shown in FIG. 1, packet 100 is first received in the networked device. Then, the received packet 100 is time-stamped, usually based on when it was received by or entered into the device that includes CBP 110.

Once stored in CBP 110, packet 100 is aged, usually along with other packets in CBP 110. Typically, aging involves the AGING COUNT value of each packet in CBP 110 being incremented upwards by a value of "1". Usually, the aging of all packets in CBP 110 is triggered by an aging pulse that affects packets in CBP 110 at a regular time interval.

If a packet in CBP 110 is selected to be forwarded from an egress of the device that includes CBP 110, a decision is first made concerning whether the selected packet is to be sent from a port of the device. This decision is based on how much the selected packet has been aged.

For example, if packet 100 had been in CBP 110 long enough for the AGING COUNT portion thereof to have increased to a value of "6", and if the maximum allowed AGING COUNT value is "7", then packet 100 will be forwarded out of the device. However, if the AGING COUNT portion of packet 100 had been aged such that its value is "7", then packet 110 will not be forwarded from the device.

The above-discussed related art method of aging packets in the CBP of a networked device has several disadvantages. One of these disadvantages is related to the fact that the CBP of networked devices is relatively large, at least in the sense that the CBP includes many cells in which packets may be stored. Hence, updating/incrementing the AGING COUNT values of all packets in the CBP of a typical networked device according to the related art pursuant to the receipt of an aging pulse is an inherently inefficient process.

In addition, the related art method of aging packets is susceptible to a phenomenon known as "wrap-around". This phenomenon is explained below with reference to FIG. 2. At the top of FIG. 2, packet 100 is illustrated at a time t=0 when it has just entered a networked device and when the AGING COUNT value of packet 100 equals "0". Progressing downward in FIG. 2, packet 100 is illustrated at two later times $t_1$, $t_2$, at which the AGING COUNT value has become progressively higher. Then, at an even later time $t_3$, the AGING COUNT value of packet 100 has reached its maximum allowable value. Finally, at time $t_4$ at the bottom of FIG. 2, packet 100 is again illustrated as having an AGING COUNT value of "0".

In FIG. 2, if the determination of whether to send the packet 100 from the device is made at time $t_3$, a proper decision will be made to not send out expired packet 100. However, if a determination is not made until time $t_4$, an aging pulse that affected packet 100 after time $t_3$ will have caused the AGING COUNT value at time $t_3$ to have "wrapped around" back to "0". Hence, packet 100 will be sent out, even though it should have been recognized as having expired.

At least in view of the above, what is needed are devices and methods that reduce the amounts of memory that is dealt with when implementing a datagram aging process. Also, what is needed are methods and systems that prevent the above-discussed wrap-around disadvantage of the related art methods and systems.

SUMMARY OF THE INVENTION

According to certain embodiments of the present invention, a method of aging datagrams in a network device is provided. According to this method, a datagram is received in a first memory unit of a network device. Also according to this method, the datagram is assigned an initial aging counter value that is based upon an attribute of the datagram.

According to certain other embodiments of the present invention, a network device is provided. This device typically includes a first memory unit configured to store one or more datagrams therein. The device also commonly includes a second memory unit, operably connected to the first memory unit, the second memory unit being configured to store an aging counter value of the datagram may be stored. In addition, the device typically includes a third memory unit that is usually operably connected to the second memory unit and that is typically configured to store a flag value that indicates whether a threshold aging counter value has been reached.

Yet other embodiments of the present invention provide another network device. According to this other device, a receiving means, operably connected to the receiving means, for receiving a datagram may be included. In addition, a first storing means for storing the datagram may be included. Further, a controlling means, operably connected to the first storing means, for assigning the datagram and initial aging counter value may be included. Typically, the initial aging counter value is based upon an attribute of the datagram.

BRIEF DESCRIPTION OF THE DRAWINGS

For a proper understanding of the invention, reference should be made to the accompanying drawings, wherein.

DETAILED DESCRIPTION OF THE PREFERRED EMBODIMENTS

In order to address and/or overcome at least the shortcomings of the related art methods and devices discussed above, certain embodiments of the present invention include novel methods for datagram aging, wherein datagrams may include, but are not limited to, packets, cells, and bit streams. Also, certain embodiments of the present invention include novel devices and systems for datagram aging. Some of these are discussed below and are illustrated in the attached figures.

Figure 1:
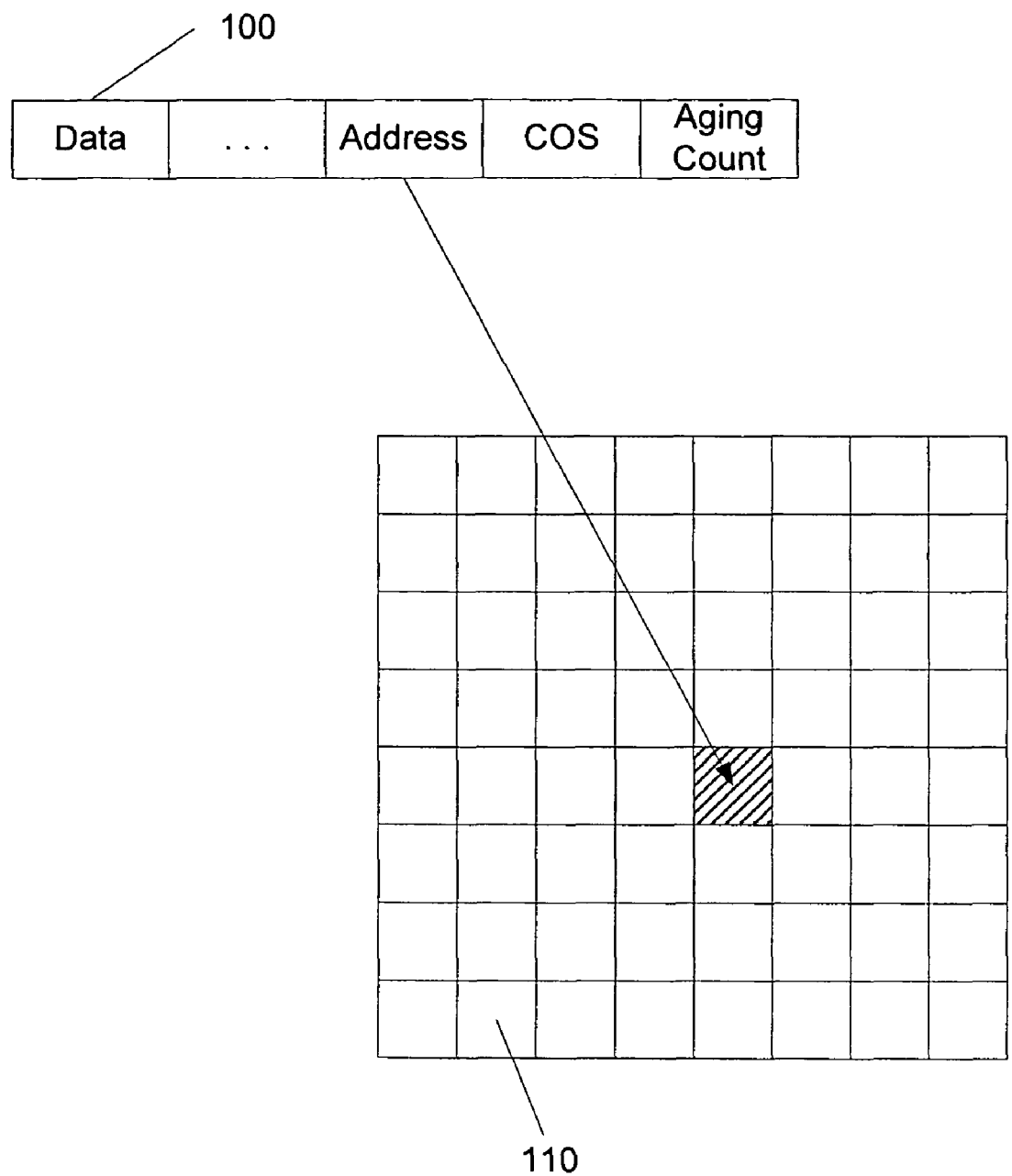
FIG. 1 illustrates a Common Buffer Pool (CBP) according to the related art for storing datagrams.
Figure 2:
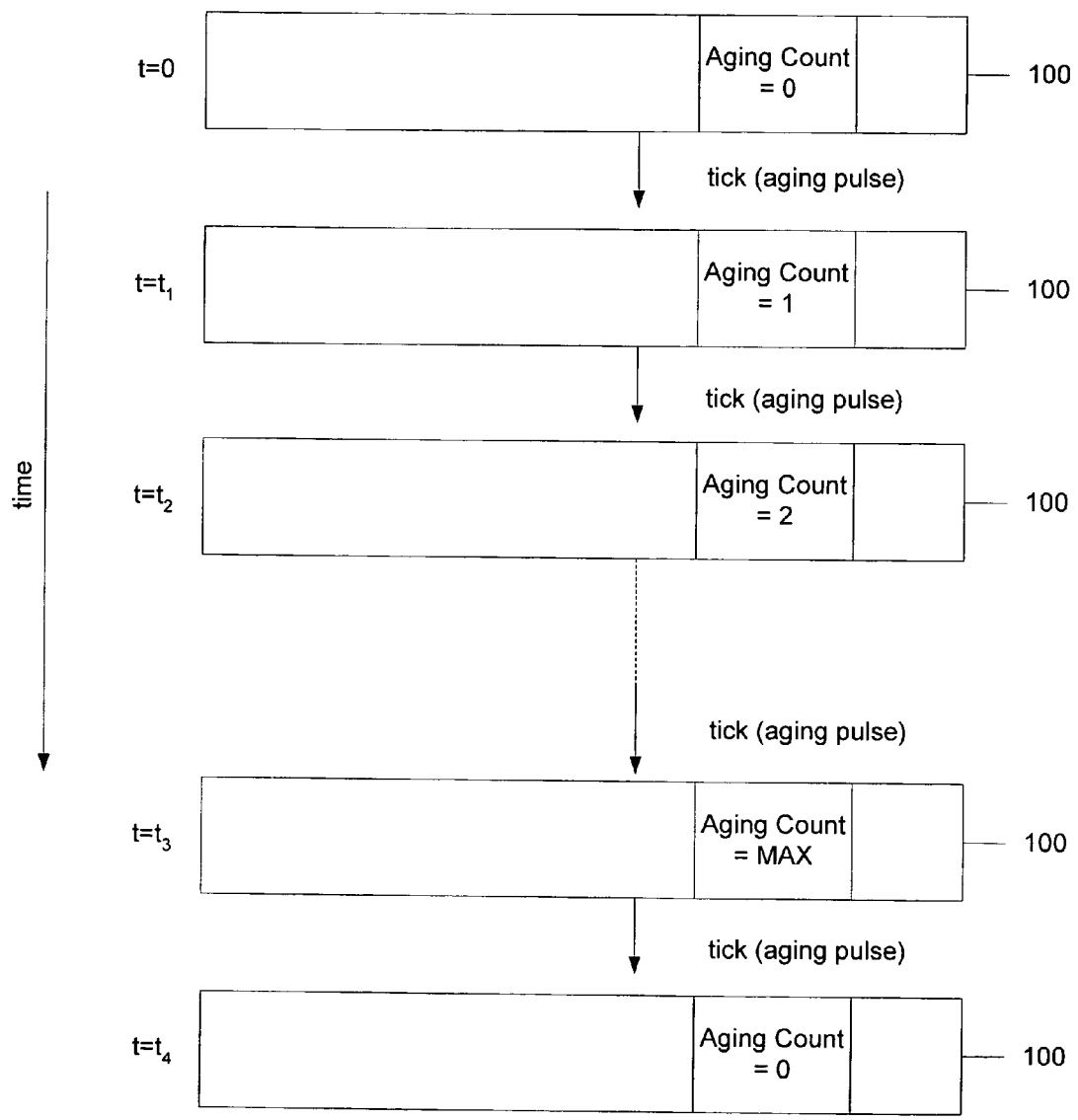
FIG. 2 illustrates how a datagram according to the related art ages over time and experiences a wrap-around phenomenon.
Figure 3:
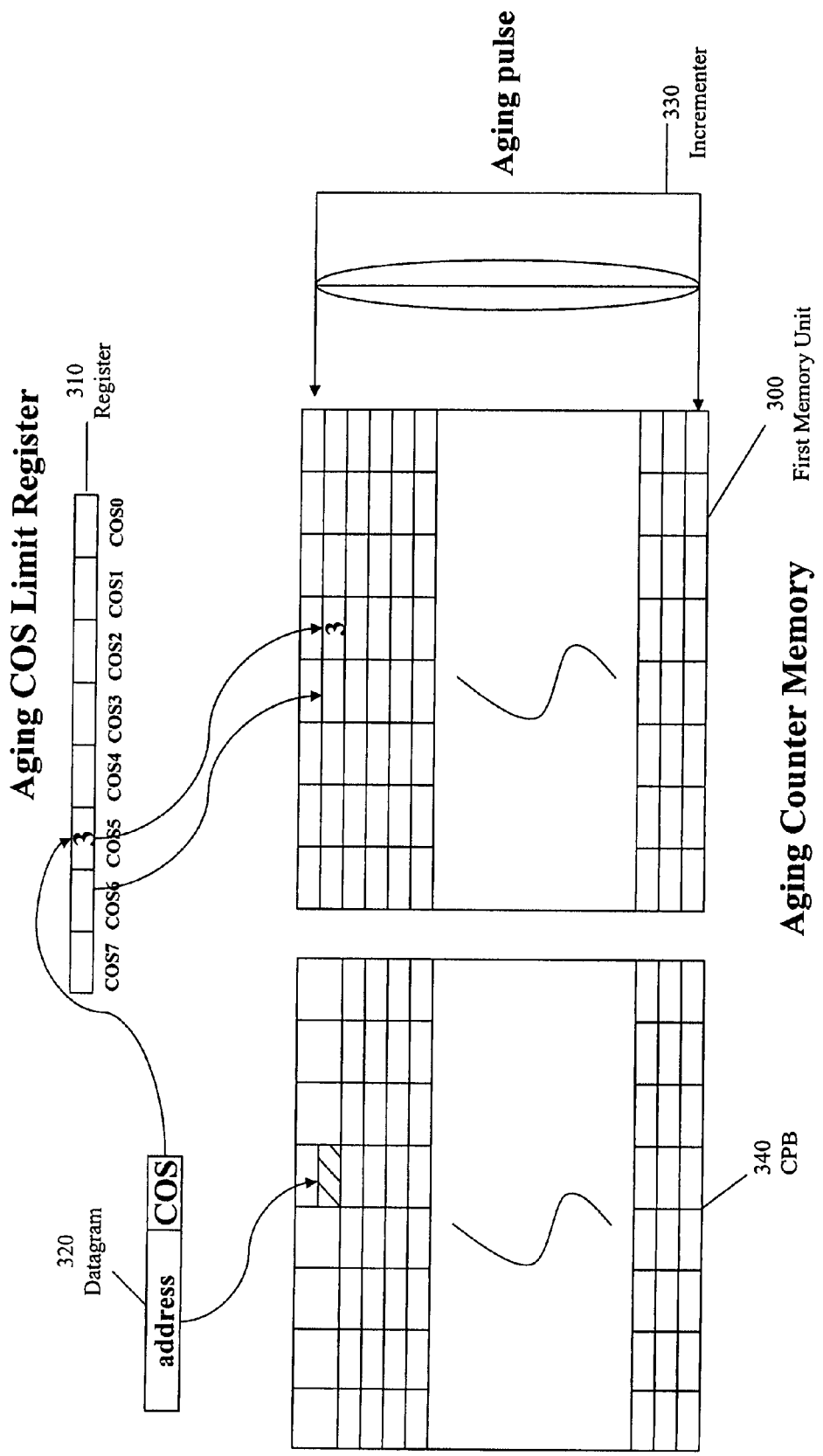
FIG. 3 illustrates an embodiment of the present invention wherein an initial aging counter value is assigned to a datagram based upon an attribute of the datagram.

FIG. 3 illustrates first memory unit 300, which may be included in a data distribution device according to certain embodiments of the present invention, and which may take the form of an aging counter memory. Also illustrated in FIG. 3 is register 310, which is typically operably connected to first memory unit 300. Datagram 320 is also illustrated in FIG. 3, as is Common Buffer Pool (CBP) 340, which may be included in the data distribution device. In FIG. 3, datagram 320 may be stored in CBP 340, which is usually operably connected to at least first memory unit 300.

Figure 4:
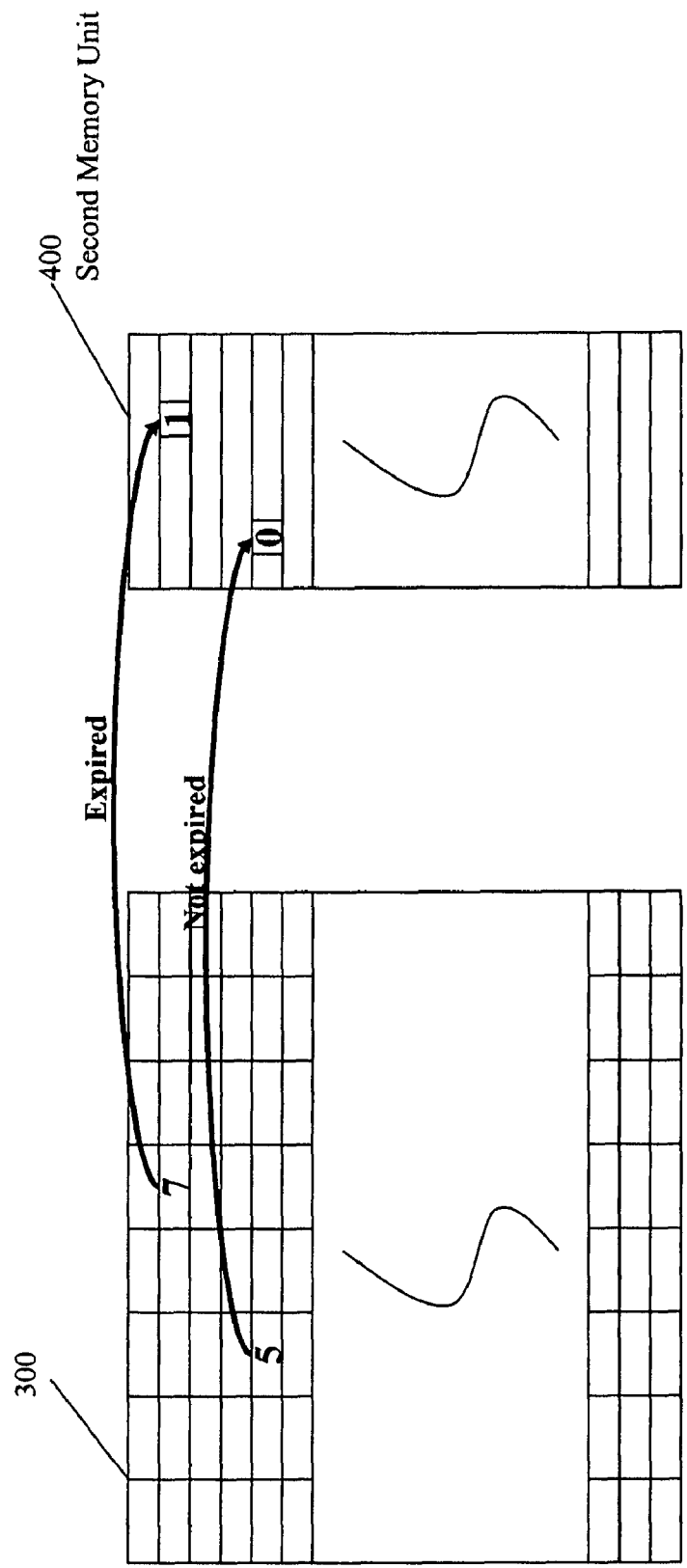
FIG. 4 illustrates an embodiment of the present invention wherein two distinct memory units are used.

FIG. 4 illustrates second memory unit 400, which is commonly operably connected at least to first memory unit 300 and which, according to certain embodiments of the present invention, takes the form of an aging expiration status memory.

When datagram 320 enters into the above-referenced datagram distribution device, it may be stored in a cell of CBP 340 that is in a location that corresponds to the value of the ADDRESS portion of datagram 320. This same ADDRESS portion of datagram 320 may also be used to specify which cells in first memory unit 300 and second memory unit 400 will be used in connection with datagram 320.

According to certain embodiments of the present invention, second memory unit 400 may be used to store flag values that indicate whether a threshold aging counter value has been reached for a particular datagram in CBP 340. According to certain embodiments, first memory unit 300 is configured to have the aging counter value stored therein updated upon emission of an aging pulse in the device. According to certain other embodiments, second memory unit 400 is configured to be read before allowing a datagram stored in the first memory unit to be forwarded by an egress of the device that is operably connected to the first memory unit. However, no particular restrictions are made on the type of memories that may be included in memory units 300 and 400.

Register 310 can be operably connected at least to first memory unit 300, as shown in FIG. 3. According to certain embodiments of the present invention, register 300 assigns an initial aging counter value to datagram 320 as it enters into the data distribution device and is stored in CBP 340. Normally, the initial aging counter value is based on an attribute of datagram 320. For example, register 310 may assign the initial aging counter value based on the Class-of-Service (COS) of datagram 320.

Figure 5:
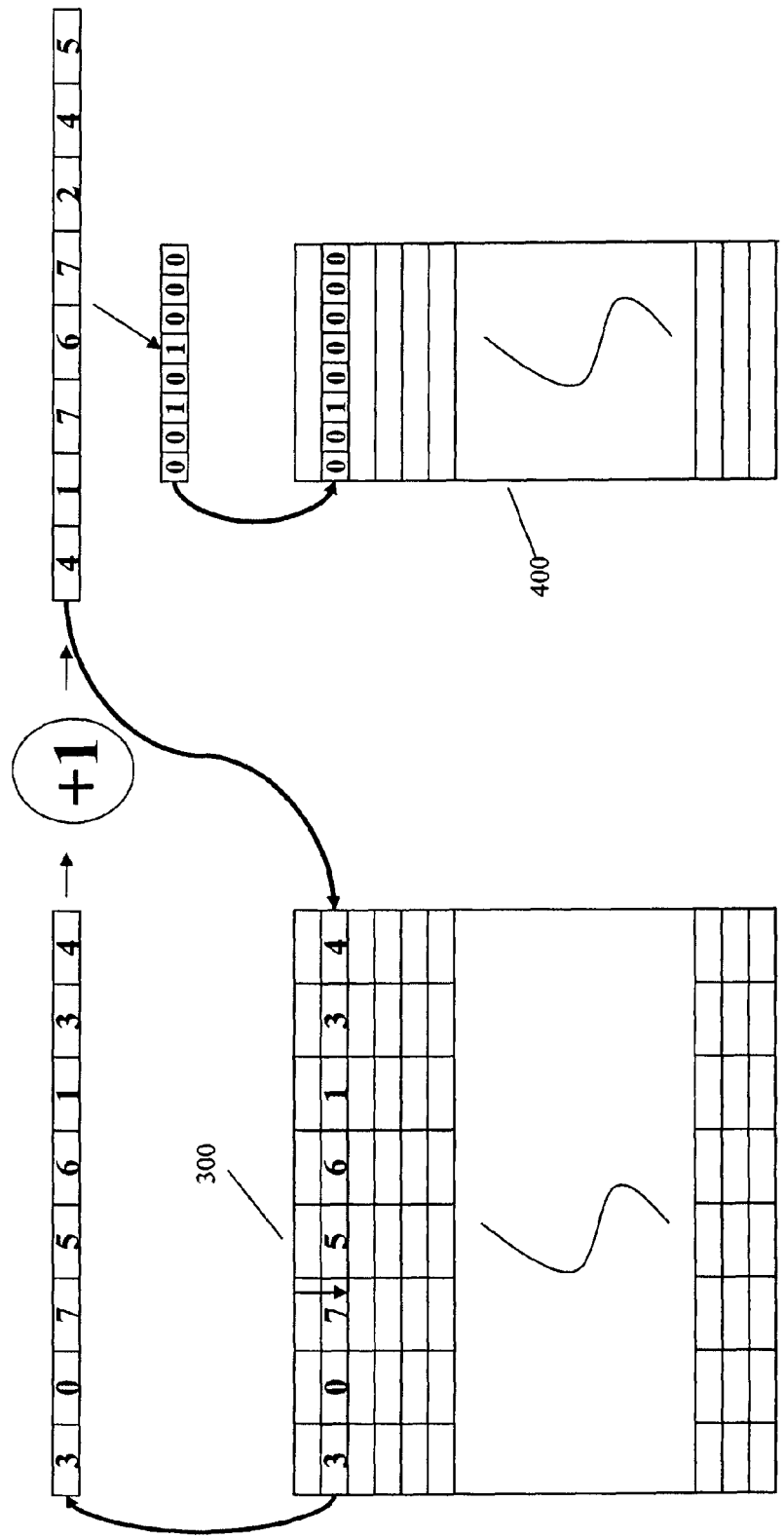
FIG. 5 illustrates an embodiment of the present invention wherein the aging counter value of a set of datagrams is incremented.

Some datagram distribution devices according to certain embodiments of the present invention include incrementer 330. Incrementer 330 is typically capable of increment the aging counter values of datagrams that are stored in CBP 340. Usually, these aging counter values are stored in first memory unit 300, as illustrated in FIGS. 3-5. Typically, incrementer 330 is operably connected at least to first memory unit 300.

According to other embodiments of the present invention, a decrementer may function analogously to incrementer 330 by decrementing the aging counter values of datagrams that are stored in CBP 340. Typically, a decrementer is operably connected at least to first memory unit 300.

Datagram distribution devices according to certain embodiments of the present invention typically include at least one port that allows for datagrams to enter into and/or be forwarded by the devices. When one or more ports are included, each of these ports may serve as means for receiving datagrams. However, one skilled in the art will appreciate that ports are not the only means for receiving datagrams that may be used according to the present invention.

According to certain embodiments of the present invention, CBP 340 may be used as a first storing means, operably connected to the receiving means, for storing datagrams in a data distribution device. However, as will be appreciated by one skilled in the art of the present invention, CBP 340 is not the only embodiment of a first storing means that may be used according to the present invention.

As illustrated in FIG. 3 and register 310 may be included in data distribution devices and/or network devices according to certain embodiments of the present invention. According to certain embodiments, register 310 provides a controlling means, operably connected to the first storing means, that may be used for assigning initial aging counter values to datagrams entering a data distribution device or other network device. However, one skilled in the art will appreciate that other controlling means are also within the scope of certain embodiments of the present invention.

Usually, the initial aging counter values are based upon an attribute of the datagrams. According to certain embodiments of the present invention, the register 310, or some other controlling means, assigns the initial aging counter values based on the COS of each of the datagrams.

As discussed above and illustrated in FIG. 3, incrementer 330, may be included in devices according to certain embodiments of the present invention. Typically, incrementer 330 is capable of aging datagram 320 by incrementing the aging counter value thereof once datagram 320 is stored in first memory unit 300. As such, incrementer 330 may function as an incrementation means and may be included as part of certain data distribution devices according to the present invention. As will be appreciated by those skilled in the art of the present invention, incrementation means other than incrementer 330 are also within the scope of certain embodiments of the present invention, as are decrementation means, which may take the form of the above-discussed decrementer.

As also discussed above, first memory unit 300, illustrated in FIG. 3, may be included in devices according to the present invention. According to certain embodiments of the present invention, first memory unit 300 may function as a second storing means for storing the aging counter values assigned by the controlling means. However, many other components/devices may also function as second storing means according to certain embodiments of the present invention.

Second memory unit 400, shown in FIG. 4 and discussed above, may be included in devices according to certain embodiments of the present invention. According to certain embodiments of the present invention second memory unit 400 functions as a third storing means that is capable of storing a flag value that indicates whether a threshold aging counter value has been reached for each of the datagram stored in the CPB 340. Although second memory unit 400 serves as the third storing means in FIG. 4, other components/ devices may also be used as the third storing means.

Although not illustrated in the above-discussed figures, a memory control unit may be operably connected to memory unit 300, memory unit 400, and/or CBP 340. According to certain embodiments of the present invention, this memory control unit may function as a restriction means that, typically, is capable of preventing a datagram from being forwarded by a datagram distribution or other network device when the flag value for that particular datagram indicates that the threshold aging counter value thereof has been reached. Though only a memory control unit is discussed above, other components/devices may also function as restriction means according to certain embodiments of the present invention.

FIG. 5 illustrates an embodiment of the present invention wherein first memory unit 300, illustrated as a grid in the lower left-hand portion of the figure, has a number of cells included therein. These cells are storing aging counter values that reflect how long various datagrams have been in CBP 340. More specifically, in FIG. 5, the numbers included in the second row from the top of the grid representing first memory unit 300 are each associated with a datagram that has been stored in CBP 340, shown in FIG. 3.

According to the embodiment of the present invention illustrated in FIG. 5, "7" is the pre-set threshold allowable aging counter value and none of the cells in first memory unit 300 exceed this value. Rather, once the aging counter value of a datagram stored in CBP 340 reaches "7" in first memory unit 300, that datagram has expired.

It should be noted that, in the example discussed above, "7" is only an example of a pre-set value. Hence, virtually any value could be selected, usually based on system requirements.

In FIG. 5, above the illustration of first memory unit 300, the second row from the top thereof is illustrated. In the middle of the top portion of FIG. 5, a circled "+1" value indicates that the above-discussed second row is subjected to a tick or aging pulse that, as shown in the top right-hand portion of FIG. 5, increments seven of the eight values in this row by a value of 1. It should be noted, however, that according to certain other embodiment of the present invention, a tick or aging pulse may either increment or decrement values by larger integers than "1".

The third aging counter value from the left in this row remains at the value of "7" because, as discussed above, for this embodiment, "7" was the pre-set threshold value (in this case, a maximum value) that could be assigned as an aging counter value. Since this threshold value has been reached, the datagram in CBP 340 that is associated with the cell of first memory unit 300 storing the "7" value should not and generally will not be allowed to be sent from the data distribution device that includes CBP 340.

Once the appropriate aging counter values in the row discussed above have been incremented, the appropriate cells in second memory unit 400 illustrated in FIG. 5 may now be filled/updated with values that reflect the status of the datagrams whose aging counter values are included in the row in the top right-hand portion of FIG. 5. It should be noted that, in FIG. 5, since first memory unit 300 and second memory unit 400 each have the same number of cells in grids of identical dimensions, cells in the same rows and columns of memories 300 and 400, respectively, correspond to the same datagrams in CBP 340 and are therefore associated with each other.

It should also be noted that, although much of the discussion contained herein is directed at incrementing aging counter values, certain embodiments of the present invention are also directed at decrementing aging counter values. According to some of these embodiments, an initial aging counter value may be, for example, a positive integer, and a datagram associated with this initial aging counter value may expire once decremented to, for example, a value of "0".

Starting from the left-hand side of the row illustrated in the top right-hand portion of FIG. 5, since the third and fifth values are each "7", each of the datagrams associated therewith in CBP 340 have expired. Hence, according to certain embodiments of the present invention, the third and fifth values from the left-hand side of the second row from the top of the grid representing second memory unit 400 in the bottom right-hand portion of FIG. 5 indicate the expired datagrams by flag values of "1". Therefore, pursuant to the above-discussed tick or aging pulse, the "1" values in second memory unit 400 each indicate expired datagrams, while the "0" values indicate that the remainder of the datagrams have not expired.

Since the second memory unit 400 illustrated at the bottom right-hand portion of FIG. 5 reflected the status of datagrams in CBP 340 before the above-discussed aging pulse affected the aging values in first memory unit 300, the second row from the top thereof should be updated to show the additional flag value of "1" in the fifth box from the left thereof.

According to certain embodiments of the present invention, a data distribution device, before allowing a datagram to be sent therefrom, reads the cell in second memory unit 400 corresponding to the datagram about to be forwarded. If the value of that cell is "1", or another flag value indicating that the datagram has expired, the datagram will not be forwarded. However, if the cell value is "0", or another value that indicates that the datagram has not expired, the datagram will be forwarded.

It should be noted that the cells in second memory unit 400 generally do not return to "0" values once they have been set to a "1" value unless the datagram in CBP 340 associated with the particular "1" value has been removed from CBP 340. However, either a cell-by-cell or global reset may be performed to change flag values to values that do not indicate expiration of the datagram(s) in question.

One advantage that is provided by the embodiments of the present invention illustrated in FIG. 5 is that, upon potential forwarding of a datagram, a relatively small amount of memory has to be checked before allowing a datagram to be forwarded. More specifically, in the example illustrated in FIG. 5, only second memory unit 400 is generally checked before forwarding a datagram, as opposed to checking CBP 340, which is significantly larger.

Another advantage of the present invention is that wrap-around is not generally possible. Wrap-around has been eliminated by the fact that, according to certain embodiments of the present invention, once a cell value in second memory unit 400 has been updated to a flag value that indicates that a threshold aging counter value has been reached, this flag value is generally not reset unless the datagram associated therewith is removed from the CBP or a specific operation for resetting the value is performed.

In other words, in the upper right hand portion of FIG. 5, if another aging pulse were to increment the value of all of the cells of the second row from the top illustrated therein, the fourth cell from the left side of the row would be incremented to "7", thereby incrementing the associated value of the cell in the second memory unit 400. However, even if the third or fifth values from the left side of the row were inadvertently re-set to "0", no such re-setting would occur in cells of second memory unit 400, and previously expired datagrams would still be reflected as expired.

Figure 6:
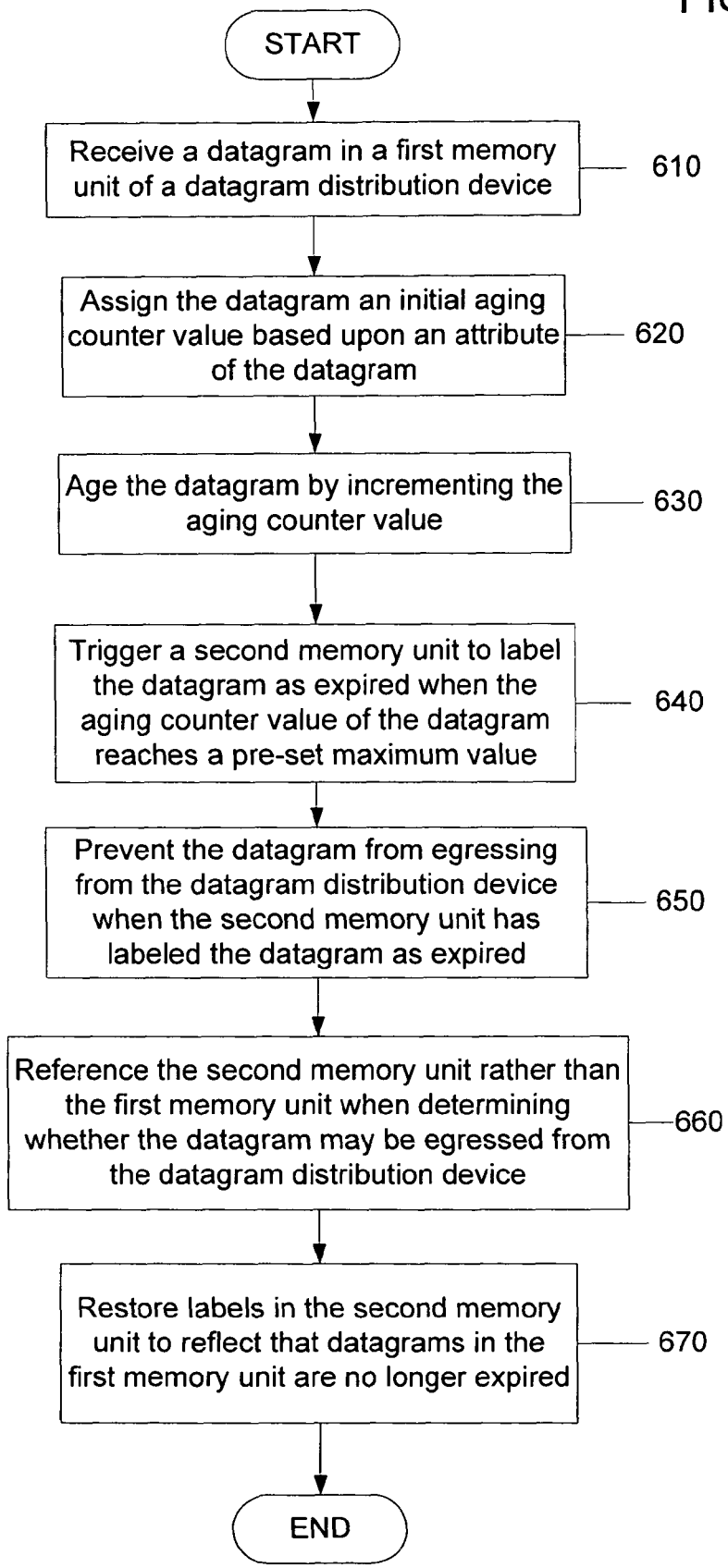
FIG. 6 illustrates a flowchart that includes the steps of a method according to certain embodiments of the present invention for aging a datagram.

FIG. 6 illustrates a flowchart 600 including the steps of a representative method according to certain embodiments of the present invention for aging datagrams. In FIG. 6, step 610 illustrates receiving a datagram in a first memory unit of a datagram distribution device. Step 620 then illustrates assigning the datagram and initial aging counter value based upon an attribute of the datagram. According to certain embodiments of the present invention, the datagram attribute includes Class-of-Service (COS).

Step 630 of FIG. 6 illustrates aging the datagram by incrementing the aging counter value. Then, step 640 illustrates triggering a second memory unit to indicate the datagram as expired when the aging counter value of the datagram reaches a pre-set threshold value.

Step 650 illustrates preventing the datagram from being sent from the datagram distribution device when the second memory unit has indicated the datagram as expired. Step 660 illustrates accessing the second memory unit to determine whether the datagram is to be forwarded from the network device.

Step 670 then illustrates restoring indications in the second memory unit to reflect that datagrams in the first memory unit are no longer expired. Step 670 is typically performed when the above-described Common Buffer Pool of the data distribution device is cleared of datagrams, either globally or partially.

One having ordinary skill in the art will readily understand that the invention, as discussed above, may be practiced with steps in a different order, and/or with hardware elements in configurations which are different than those which are disclosed. Therefore, although the invention has been described based upon preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of aging datagrams in a switch, the method comprising:
    receiving a datagram in a first memory unit of a network device;
    assigning the datagram an initial aging counter value based upon an attribute of the datagram;
    storing the aging counter value in a second memory unit of the network device, wherein the second memory unit is operably connected to the first memory unit;
    updating a flag value stored in a third memory unit when the stored aging counter value has reached a pre-selected threshold;
    reading the flag value from the third memory unit before forwarding the datagram; and
    preventing the datagram from being forwarded from the network device when the flag value stored in the third memory unit indicates that the stored aging counter value has reached the pre-selected threshold and the datagram has expired,
    wherein the third memory unit is operably connected to the second memory unit.

2. The method of claim 1, wherein, in the assigning, the datagram attribute comprises Class-of-Service (COS).

3. The method of claim 1, further comprising:
    aging the datagram by incrementing the stored aging counter value.

4. The method of claim 3, wherein the updating comprises triggering the flag value of the third memory unit to indicate the datagram as expired when the stored aging counter value of the datagram reaches the pre-selected threshold.

5. The method of claim 1, further comprising:
    aging the datagram by decrementing the stored aging counter value.

6. The method of claim 1, wherein the reading the flag value from the third memory unit comprises accessing the flag value in the third memory unit to determine whether the datagram is to be forwarded from the network device.

7. The method of claim 1, further comprising:
    restoring the flag value in the third memory unit to reflect that datagrams in the first memory unit are no longer expired.

8. The method of claim 1, wherein the switch is a datagram distribution device.

9. A network device comprising:
    a port configured to receive datagrams;
    a first memory unit configured to store the datagrams;
    a second memory unit, operably connected to the first memory unit, said second memory unit configured to store an aging counter value assigned to a datagram stored in the first memory unit;
    a controller configured to assign the aging counter value to the datagram;
    a third memory unit, operably connected to the second memory unit, said third memory unit configured to update a flag value stored in the third memory unit when the stored aging counter value has reached a pre-selected threshold; and
    a control unit configured to:
        check the flag value stored in the third memory unit before allowing the datagram stored in the first memory unit to be forwarded from the network device; and
        prevent the datagram from being forwarded if the flag value stored in the third memory unit indicates that the stored aging counter value has reached the pre-selected threshold.

10. The device of claim 9, wherein the second memory unit is configured to have the aging counter value stored therein and updated upon emission of an aging pulse in the device.

11. The device of claim 9, further comprising: an egress operably connected to the first memory unit and configured to forward the datagram from the first memory unit out of the network device.

12. The device of claim 9, further comprising:
    a controlling means, operably connected to the second memory unit and configured to assign an initial aging counter value to the datagram entering in the first memory unit.

13. The device of claim 12, wherein the controlling means is configured to assign the initial aging counter based on an attribute of the datagram.

14. The device of claim 13, wherein the initial aging counter value is based on a Class-of-Service of the datagram.

15. The device of claim 9, further comprising:
    an incrementer, operably connected to the second memory unit, said incrementer configured to increment the aging counter value stored in the second memory unit.

16. The device of claim 9, further comprising:
    a decrementer, operably connected to the second memory unit and configured to decrement the aging counter value stored in the second memory unit.

17. A network device comprising:
receiving means for receiving a datagram;
first storing means, operably connected to the receiving means, for storing the datagram;
controlling means, operably connected to the first storing means, for assigning the datagram an initial aging counter value based upon an attribute of the datagram;
second storing means for storing the aging counter value, wherein the second storing means is operably connected to the first storing means;
third storing means for updating a flag value stored in the third storing means when the stored aging counter has reached a pre-selected threshold; and
restriction means, operably connected to the first storing means, for preventing the datagram from being forwarded from the network device when the flag value stored in the third storing means indicates that the stored aging counter value has reached the pre-selected threshold.

18. The device of claim 17, further comprising:
incrementation means, operably connected to the second storing means, for aging the datagram by incrementing the stored aging counter value.

19. The device of claim 17, further comprising:
decrementation means, operably connected to the second storing means, for aging the datagram by decrementing the stored aging counter value.

20. The device of claim 18, wherein the controlling means assigns the initial aging counter value based on Class-of-Service of the datagram.

* * * * *